United States Patent
Ishihara et al.

(10) Patent No.: US 6,315,929 B1
(45) Date of Patent: Nov. 13, 2001

(54) MOLD ASSEMBLY FOR FORMING OPHTHALMIC LENS, METHOD OF PRODUCING THE SAME, AND METHOD OF PRODUCING OPHTHALMIC LENS USING THE MOLD ASSEMBLY

(75) Inventors: Kenichi Ishihara, Kasugai; Motonobu Togo, Inuyama, both of (JP)

(73) Assignee: Menicon Co., Ltd., Nagoya (JP)

( * ) Notice: Subject to any disclaimer, the term of this patent is extended or adjusted under 35 U.S.C. 154(b) by 0 days.

(21) Appl. No.: 09/309,010

(22) Filed: May 10, 1999

(30) Foreign Application Priority Data

May 15, 1998 (JP) .................................................. 10-133667

(51) Int. Cl.⁷ .................................................. B29D 11/00
(52) U.S. Cl. .................. 264/2.5; 249/114.1; 249/134; 264/1.38; 264/2.7; 425/808
(58) Field of Search ............................. 264/1.36, 1.38, 264/1.1, 2.5, 338, 334, 219, 2.7; 425/808; 249/114.1, 117, 134

(56) References Cited

U.S. PATENT DOCUMENTS

| | | |
|---|---|---|
| 4,129,628 | 12/1978 | Tamutus . |
| 4,209,289 * | 6/1980 | Newcomb et al. .................. 425/808 |
| 4,540,532 * | 9/1985 | Petcen et al. ......................... 425/808 |
| 4,985,186 | 1/1991 | Nose et al. . |
| 5,524,419 | 6/1996 | Shannon . |
| 5,951,934 * | 9/1999 | Wickes et al. ......................... 264/2.5 |

FOREIGN PATENT DOCUMENTS

| | | | |
|---|---|---|---|
| 2 270 081 * | 1/1976 | (FR) . | |
| 63-36484 | 7/1988 | (JP) . | |
| 3-1125 | 1/1991 | (JP) . | |
| 8-1673 | 1/1996 | (JP) . | |
| 62-297119 * | 12/1998 | (JP) .................................... | 264/2.5 |

* cited by examiner

*Primary Examiner*—Mathieu D. Vargot (57) ABSTRACT

A mold assembly for forming an ophthalmic lens, the mold assembly comprising a first mold and a second mold which cooperate with each other to define therebetween a mold cavity having a profile following that of the ophthalmic lens, wherein the improvement comprises: at least one of the first and second molds being a coated mold consisting of a body portion including a backing surface having rigidity and mechanical strength enough to withstand a molding operation for forming the ophthalmic lens in the mold cavity, and a thermoplastic film retained on the body portion such that the thermoplastic film covers the backing surface of the body portion, the thermoplastic film having a molding surface which partially defines the mold cavity and which gives a corresponding one of opposite surfaces of the ophthalmic lens.

9 Claims, 4 Drawing Sheets

MOLD ASSEMBLY FOR FORMING OPHTHALMIC LENS, METHOD OF PRODUCING THE SAME, AND METHOD OF PRODUCING OPHTHALMIC LENS USING THE MOLD ASSEMBLY

The present application is based on Japanese Patent Application No. 10-133667 filed May. 15, 1998, the content of which is incorporated hereinto by reference.

BACKGROUND OF THE INVENTION

1. Field of the Invention

The present invention generally relates to a mold assembly for forming an ophthalmic lens, a method of producing the mold assembly, and a method of producing the ophthalmic lens by using the mold assembly. More particularly, the present invention is concerned with such a mold assembly for forming the ophthalmic lens such as a contact lens or an intraocular lens, which mold assembly does not suffer from undesirable deformation during a molding operation for forming the intended ophthalmic lens, to thereby permit easy and economical production of an ophthalmic lens having a desired configuration, and an advantageous method of producing such a mold assembly. Further, the invention is concerned with a method of producing the ophthalmic lens with the desired configuration at a relatively low cost, by using the mold assembly.

2. Discussion of the Related Art

There are proposed various techniques for producing an ophthalmic lens by a mold assembly consisting of a first mold and a second mold in the form of a male mold and a female mold, or an upper mold and a lower mold, which are assembled to define therebetween a mold cavity having a configuration that gives the intended ophthalmic lens such as a contact lens or an intraocular lens. The mold cavity defined upon closing of the first and second molds is filled with a suitable lens material to mold the intended ophthalmic lens.

JP-B-63-36484 and JP-B-3-1125 disclose a method of producing an ophthalmic lens by a molding operation, comprising the steps of assembling male and female molds together to define a mold cavity therebetween, introducing a polymeric material into the mold cavity, and polymerizing the polymeric material, to thereby provide the ophthalmic lens having an intended configuration. In the proposed method, the male and female molds are formed of a resin material rather than a metallic material, for assuring easy removal of the molded lens from the molds, and improved molding efficiency. In the male and female molds formed of the resin material, however, the surface conditions of the molding surfaces defining the mold cavity tend to vary during the molding operation. Moreover, the molds are easily deformed upon removal or releasing of the molded product therefrom, making it impossible to repeatedly use the molds in subsequent molding operations. Like ordinary resin products or articles, the resin-made male and female molds are generally produced by high-pressure molding such as injection molding, using metallic dies. The metallic dies used in the high-pressure molding need to have a high mechanical strength, and maintain the original surface condition which is sufficient to provide molding surfaces of the male and female molds with high accuracy of configuration, since the molding surfaces of the molds give the opposite surfaces of the ophthalmic lens to be obtained. Such high-pressure molding, however, undesirably and inevitably requires expensive equipment.

U.S. Pat. No. 5,524,419 discloses one example of a method and an apparatus for forming a contact lens by a molding operation, wherein a first and a second web each having a suitable width are continuously fed and subjected to a vacuum-forming operation for forming a succession of male molds in the form of posterior mold cavities in the first web, and a succession of female molds in the form of anterior mold cavities in the second web. These posterior and anterior mold cavities are formed in the first and second webs, respectively, such that the mold cavities are spaced apart from each other in the longitudinal direction of the first and second webs with a predetermined interval therebetween. After a predetermined amount of a curable lens material is introduced into each anterior mold cavity (as the female mold), the first and second webs are superposed on each other to close the male and female molds together. Thereafter, the lens material in the mold cavities between the male and female molds are polymerized by exposure to light, to thereby form the intended ophthalmic lens in each mold cavity. Subsequently, the first and second webs are separated from each other, and the contact lenses molded in the mold cavities are removed from the mold cavities.

In forming the male and female molds in the respective first and second webs by the vacuum-forming operation as disclosed in the above US Patent, the thickness of the webs in which the male and female molds are to be formed needs to be made small to a certain extent. If the thickness of the webs is relatively small, the male and female molds formed in the thin webs undesirably tend to be deformed during the molding operation for forming the contact lens. Accordingly, the contact lens molded in the deformed male and female molds may not have the intended optical characteristics.

JP-A-8-1673 discloses another example of the method and the apparatus for molding a soft contact lens by using a mold assembly which is produced by high-pressure molding such as injection molding using rigid metallic dies. In this method, the metallic dies need to have a high mechanical strength, and maintain a desired surface condition necessary to provide accurately shaped molding surfaces of the male and female molds of the mold assembly to be obtained by the metallic dies, since the molding surfaces of the male and female molds give the opposite surfaces of the soft contact lens to be obtained. Such high-pressure molding, however, undesirably and inevitably requires expensive equipment. In addition, since the male and female molds of the mold assembly obtained by the high-pressure molding as described above have a small wall thickness, the male and female molds are easily deformed during the molding operation for forming the soft contact lens. In this case, the soft contact lens molded in the deformed molds does not have the intended optical characteristics.

SUMMARY OF THE INVENTION

It is therefore a first object of the present invention to provide a mold assembly which permits production of an intended ophthalmic lens having a desired configuration, and which permits a repeated use of its components.

It is a second object of the invention to provide a method of producing such a mold assembly with relatively simple and inexpensive equipment.

It is a third object of the invention to provide a method of producing an accurately configured ophthalmic lens such as a contact lens or an intraocular lens at a relatively low cost, by using such a mold assembly.

The above-described first object of the present invention may be attained according to a first aspect of the invention, which provides a mold assembly for forming an ophthalmic lens, the mold assembly comprising a first mold and a second mold which cooperate with each other to define therebetween a mold cavity having a profile following that of the ophthalmic lens, wherein the improvement comprises: at least one of the first and second molds being a coated mold consisting of a body portion including a backing surface having rigidity and mechanical strength enough to withstand a molding operation for forming the ophthalmic lens in the mold cavity, and a thermoplastic film retained on the body portion such that the thermoplastic film covers the backing surface of the body portion, the thermoplastic film having a molding surface which partially defines the mold cavity and which gives a corresponding one of opposite surfaces of the ophthalmic lens.

In the mold assembly constructed as described above, at least one of the first and second molds of the mold assembly is a coated mold wherein the body portion is coated with the thermoplastic film which partially defines the mold cavity and has the molding surface for forming the corresponding one of the opposite surfaces of the ophthalmic lens to be obtained. Accordingly, the molding surface of the thermoplastic film is effectively supported or backed by the backing surface of the body portion, so that the molding surface given by the thermoplastic film is prevented from undesirable deformation during the molding operation for forming the ophthalmic lens. Therefore, the ophthalmic lens to be obtained by using the present mold assembly has the desired configuration. In addition, the coated mold is easily obtained by covering the backing surface of the body portion with the thermoplastic film. Further, the body portion of the coated mold can be repeatedly used by simply removing the used thermoplastic film therefrom and discarding it, after the molding operation.

In one preferred form of the above first aspect of the invention, the thermoplastic film has a thickness value of 0.1–1 mm.

In another preferred form of the above first aspect of the invention, the thermoplastic film is formed of polyolefin.

In still another preferred form of the above first aspect of the invention, the thermoplastic film is retained in close contact with the backing surface of the body portion by a press forming operation, so that the thermoplastic film cooperates with the body portion to provide the coated mold.

The above-described second aspect of the present invention may be attained according to a second aspect of the invention, which provides a method of producing a mold assembly for forming an ophthalmic lens according to the above-indicated first aspect of the invention, comprising the steps of: preparing a first die functioning as the body portion of the coated mold which consists of each of the at least one of the first and second molds, and a second die which has a press forming surface having a profile following that of the corresponding one of the opposite surfaces of the ophthalmic lens; placing a sheet of thermoplastic material which has been softened by heating, between the first and second dies; and effecting a press forming operation on the sheet of the thermoplastic material interposed between the first and second dies, so that the thermoplastic film is retained on the first die functioning as the body portion, to thereby provide the coated mold consisting of the body portion and the thermoplastic film.

According to the present method described above, the coated mold which is constituted by each of the above-indicated at least one of the first and second molds is easily obtained by a simple press forming operation in which the thermoplastic film is formed on or retained in close contact with the backing surface of the body portion. This method does not require the conventionally effected high-pressure molding using relatively rigid metallic dies.

In one preferred form of the above second aspect of the present invention, the sheet of the thermoplastic material is heated prior to the press forming operation to a temperature which is higher by 50–150° C. than a second order transition point of the thermoplastic material, and the press forming operation on the sheet of the thermoplastic material is effected at a pressure of 1–100 kg/cm$^2$.

The above-described third object of the present invention may be attained according to a third aspect of the invention, which provides a method of producing an ophthalmic lens by using a mold assembly according to the above-indicated first aspect of the invention, comprising the steps of: assembling the first and second molds together to define the mold cavity therebetween, the coated mold consisting of the body portion and the thermoplastic film which covers the backing surface of the body portion; effecting a molding operation in which a lens material is introduced into the mold cavity for forming the ophthalmic lens in the mold cavity; and disassembling the first and second molds from each other for removing the ophthalmic lens formed in the mold cavity defined between the first and second molds.

According to the method described above, the coated mold constituted by each of the above-indicated at least one of the first and second molds consists of the body portion and the thermoplastic film retained on the body portion. In the present method, the thermoplastic film which gives the molding surface is backed by the backing surface of the body portion, so that the thermoplastic film is effectively prevented from being deformed during the molding operation for forming the ophthalmic lens. Accordingly, the obtained lens has an intended or desired optical surface configuration. In addition, the body portion of the coated mold can be repeatedly used, thereby effectively reducing the cost of manufacture of the mold assembly, and accordingly reducing the cost of manufacture of the ophthalmic lens.

In one preferred form of the above third aspect of the present invention, the step of effecting the molding operation is conducted by first introducing, into the mold cavity, a polymeric material that gives a polymer which forms the ophthalmic lens, and then polymerizing the polymeric material in the mold cavity.

In another preferred form of the above third aspect of the present invention, the body portion and the thermoplastic film which cooperate with each other to provide the coated mold are formed of a light-transmitting material, and the polymeric material which is introduced in the mold cavity is polymerized by light transmitted through the body portion and the thermoplastic film.

In still another preferred form of the above third aspect of the present invention, the at least one of the first and second molds functioning as the coated mold consists of one of the first and second molds, and the step of disassembling the first and second molds is effected by first removing the coated mold while the ophthalmic lens is held on the thermoplastic film of the coated mold, and then removing the body portion and the thermoplastic film from the ophthalmic lens.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which.

DETAILED DESCRIPTION OF THE PREFERRED EMBODIMENTS

Figure 1A:
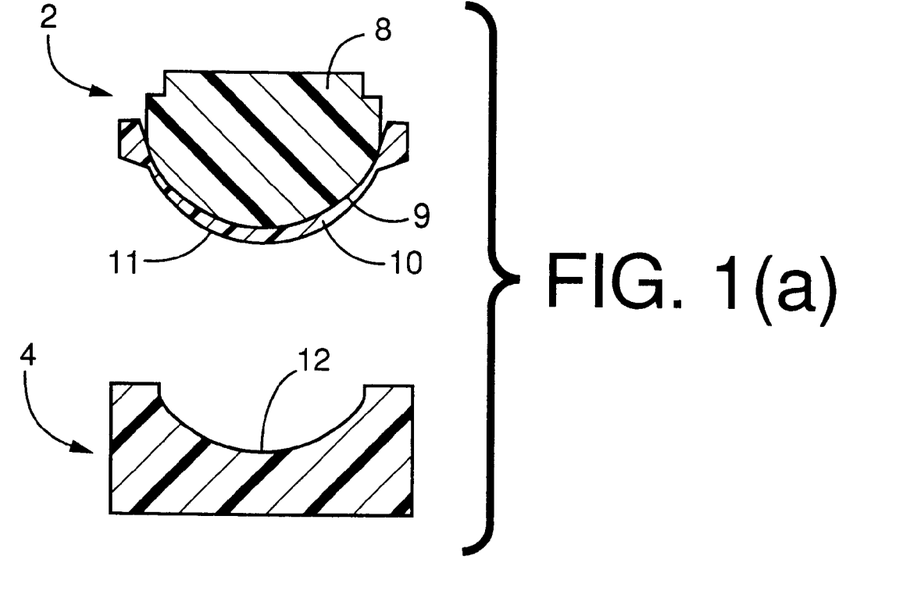
FIG. 1(a) is an elevational view in cross section of a mold assembly including a coated male mold and a non-coated female mold, which mold assembly is constructed according to one embodiment of the present invention, the view showing the mold assembly before the two molds are closed together.
Figure 1B:
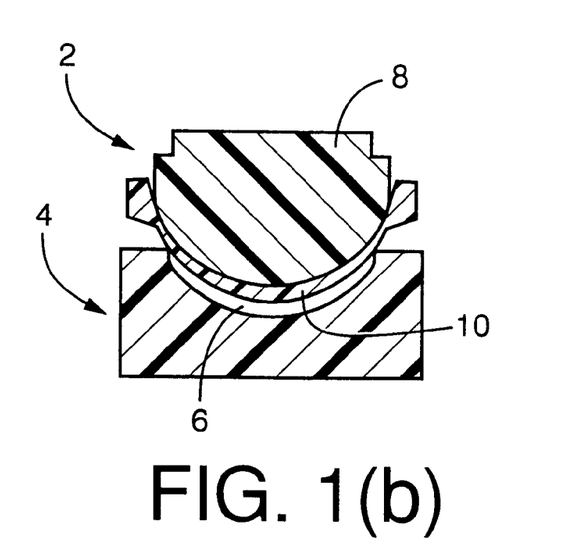
FIG. 1(b) is an elevational view in cross section of the mold assembly of FIG. 1(a), the view showing the mold assembly when the two molds are closed together.

Referring first to FIGS. 1(a) and 1(b), there is shown a mold assembly constructed according to one embodiment of the present invention. The mold assembly includes a male mold 2 and a female mold 4. As shown in FIG. 1(b), the male and female molds 2, 4 are closed together to define a mold cavity 6 therebetween whose profile follows that of an intended ophthalmic lens, e.g., a contact lens in this embodiment.

In the present embodiment, the male mold 2 is a coated mold constructed according to the principle of the present invention, which coated mold 2 consists of a body portion 8 having a backing surface in the form of a convex surface 9, and a thermoplastic film 10 which is retained on the body portion 8 such that the thermoplastic film 10 covers the convex surface 9 of the body portion 8. The thermoplastic film 10 which is fixedly formed on the body portion 8 has a convex molding surface 11 whose profile follows the corresponding one of the opposite surfaces of the ophthalmic lens to be obtained. Namely, the convex molding surface 11 of the film 10 cooperates with a concave molding surface 12 of the female mold 4, to define the mold cavity 6.

Since the body portion 8 of the coated male mold 2 has a function of supporting or backing the thermoplastic film 10 adhering thereto, the body portion 8 is formed of a resin material or a metallic material which has rigidity and mechanical strength enough to withstand the molding operation for forming the intended ophthalmic lens in the mold cavity 6 defined when the two molds 2, 4 are closed together. It is particularly advantageous that the body portion 8 be formed of a material whose thermal deformation temperature is higher than 80° C., so that the convex surface 9 of the body portion 8, which is coated with the thermoplastic film 10, maintains a suitable curved configuration during the molding operation, without suffering from undesirable deformation. This convex surface 9 of the body portion 8 has a profile which follows that of the corresponding one of the opposite surfaces of the intended ophthalmic lens, so that the convex molding surface 11 of the thermoplastic film 10 adhering to the convex surface 9 of the body portion 8 has a profile that gives the above-indicated one surface of the ophthalmic lens, e.g., a base curved surface (back surface) of the contact lens in this embodiment.

The thermoplastic film 10 which provides the convex molding surface 11 is formed on the body portion 8 such that the film 10 covers the convex surface 9 of the body portion 8. Since the convex molding surface 11 of the thermoplastic film 10 gives the base curved surface of the ophthalmic lens to be obtained, the thermoplastic film 10 is preferably formed of a suitable thermoplastic resin material which is not adversely affected by the material of the ophthalmic lens and its molding condition. When the thermoplastic film 10 is formed of a thermoplastic resin material such as polypropylene, polyethylene, polyethylene terephthalate, or polymethyl methacrylate resin, the surface condition of the convex molding surface 11 of the thermoplastic film 10 is prevented from being adversely influenced by the lens material injected into the mold cavity 6 and the molding condition under which the lens is molded of the lens material. In addition, the molded ophthalmic lens can be easily separated or released from the thermoplastic film 10. It is particularly preferable to use polyolefin such as polyethylene or polypropylene, which melts in a relatively short period of time, facilitating the molding operation and assuring easy removal of the obtained ophthalmic lens from the thermoplastic film 10.

The thickness of the thermoplastic film 10 is generally in a range of 0.1–1 mm for assuring high molding efficiency. If the thickness of the thermoplastic film 10 is excessively small, the thermoplastic film 10 tends to be easily ruptured or torn, deteriorating the molding efficiency. Further, the excessively thin thermoplastic film does not securely adhere to the body portion 8 due to the air entrapped between the thermoplastic film 10 and the convex surface 9 of the body portion 8. On the other hand, if the thickness of the thermoplastic film 10 is too large, the molding efficiency is undesirably deteriorated, resulting in reduced productivity of the ophthalmic lens.

For providing the coated male mold 2 consisting of the body portion 8 and the thermoplastic film 10, the thermoplastic film 10 which has been softened by heating is retained on the convex surface 9 of the body portion 8 by a simple press forming operation which will be described.

In effecting the molding operation with a suitable lens material being injected into the mold cavity 6 defined by and between the thus formed coated male mold 2 and the non-coated female mold 4 which have been closed together, the thermoplastic film 10 is prevented from being deformed during the molding operation, since the thermoplastic film 10 which provides the convex molding surface 11 that gives the above-indicated surface of the intended ophthalmic lens (the base curved surface in this embodiment) is supported and backed by the body portion 8. Accordingly, the convex molding surface 11 given by the thermoplastic film 10 maintains high accuracy of curved configuration, which permits the above-indicated base curved surface of the ophthalmic lens to have accordingly high accuracy of configuration. When the molding operation for forming the ophthalmic lens is completed, the thermoplastic film 10 is removed from the body portion 8 and finally discarded, while the body portion 8 from which the thermoplastic film 10 has been removed can be subsequently used for another molding operation by simply press-forming a new or another thermoplastic film 10 thereon, since the body portion 8 does not suffer from any damage or deformation during the molding operation, and is kept stainless or clean even after the molding operation.

The non-coated female mold 4 which cooperates with the coated male mold 2 to define the mold cavity 6 has the concave molding surface 12 which gives the other of the opposite surfaces of the intended ophthalmic lens, e.g., a front curved surface in this embodiment. While the non-coated female mold 4 may be formed of a suitable resin or a metallic material known in the art, the non-coated female mold 4 is generally a resin structure formed of the resin material similar to that of the body portion 8 of the coated male mold 2. It is preferable to use polyolefins such as polyethylene and polypropylene, or synthetic resin materials such as polystyrene, polycarbonate, polymethyl methacrylate, copolymer of ethylene and vinyl alcohol, polyacetal, polyamide, polyester and polysulfone. The non-coated female mold 4 is formed as the intended resin structure according to any known method such as injection molding or cutting, by using polypropylene in particular.

Figure 2:
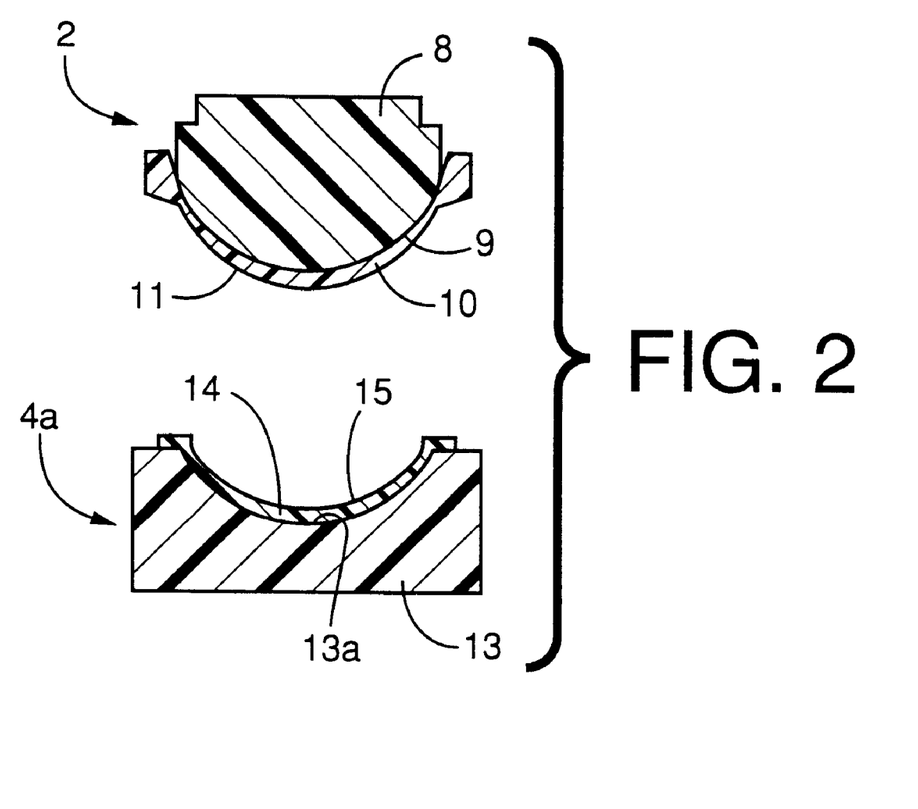
FIG. 2 is an elevational view in cross section of a mold assembly constructed according to another embodiment of the invention including the coated male and female molds, the view corresponding to that of FIG. 1(a)

While the male mold 2 of the mold assembly shown in FIG. 1 is the coated mold consisting of the body portion 8 and the thermoplastic film 10, the female mold 4 may be formed as the coated mold. Alternatively, both of the male and female molds 2, 4 may be coated molds as shown in FIG. 2, wherein a coated female mold 4a consists of a body portion 13 and a thermoplastic film 14 which covers a backing surface in the form of a concave surface 13a of the body portion 13. The thermoplastic film 14 has a concave molding surface 15 corresponding to the profile of the other surface (e.g., the front curved surface) of the ophthalmic lens to be obtained. The thermoplastic film 14 is supported or backed by the body portion 13.

In the present invention, it is particularly preferable that the mold assembly consists of the coated male mold 2 and the coated female mold 4a, as shown in FIG. 2, for assuring maximum advantages of the present invention.

Figure 3:
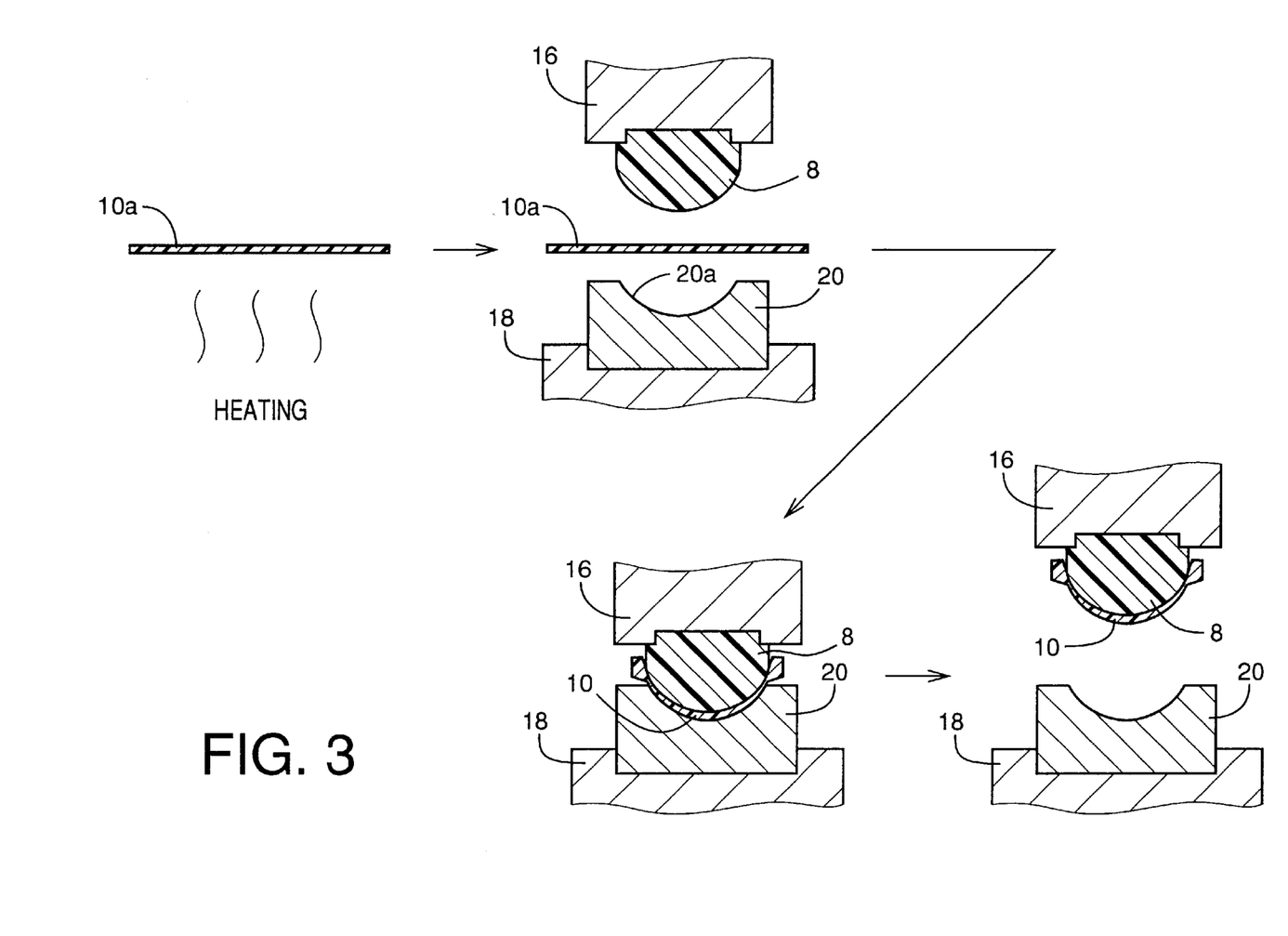
FIG. 3 is a view schematically showing a process of producing the coated male mold of the mold assembly for forming an ophthalmic lens.

In preparing the mold assembly shown in FIG. 1, the coated male mold 2 is produced according to a process as schematically indicated in FIG. 3.

Initially, a thermoplastic sheet 10a having the predetermined thickness is first heated by suitable heating means, so that the thermoplastic sheet 10a is softened. The softened thermoplastic sheet 10a is fed onto a press, such that the thermoplastic sheet 10a is interposed between the body portion 8 functioning as a first or upper die held by a first die holder 16, and a second or lower die 20 held by a second die holder 18. The die holders 16, 18 are moved relative to each other for effecting a press forming operation on the thermoplastic sheet 10a between the first die (body portion 8) and the second die 20.

The second die 20 in the press has a press forming surface 20a which gives the convex molding surface 11 of the thermoplastic film 10, which molding surface 11 in turn gives the base curved surface of the ophthalmic lens to be molded in the mold assembly 2, 4. Namely, the press forming surface 20a of the second die 20 has a profile similar to that of the base curved surface of the ophthalmic lens. While the second die 20 may be formed of any known material such as resin or metal, the second die 20 is preferably formed of a material having Rockwell hardness (HRC) of not larger than 30, for the purpose of attaining high cutting efficiency in producing the second die 20 by a cutting operation using such a material. For instance, the second die 20 is formed of a non-ferrous metal such as brass or aluminum, preferably a copper alloy for improving the cutting efficiency.

The thermoplastic sheet 10a is easily formed into the thermoplastic film 10 having the intended configuration, by the press forming operation effected between the body portion 8 and the second die 20 described above. Accordingly, the press forming operation on the thermoplastic sheet 10a can be effected at a relatively low pressure, e.g. at a pressure of 1–100 kg/cm$^2$. For facilitating the press forming operation of the thermoplastic sheet 10a, the sheet 10a has been heated to a temperature which is 50–150° C. higher than a second order transition point of the material of the sheet 10a prior to the press forming operation.

Since the thermoplastic sheet 10a is formed into the film 10 having the intended configuration by the press forming operation at the low pressure as described above, the press forming operation can be effected by using a relatively inexpensive press, such as a pneumatically operated press. Further, since the body portion 8 of the coated male mold 2 need not have a considerably high mechanical strength required in the conventional high-pressure molding, the body portion 8 can be formed of a material with a relatively low mechanical strength.

By the press forming operation described above, the thermoplastic film 10 is formed in closely adhering contact with the body portion 8 in the form of the first die, to thereby provide the intended convex molding surface 11 that gives the base curved surface of the ophthalmic lens to be obtained. After the press forming operation, the first die (8) on which the thermoplastic film 10 is formed is removed first from the second die 20, and then from the die holder 16, whereby the coated male mold 2 shown in FIG. 1 is prepared.

Figure 4:
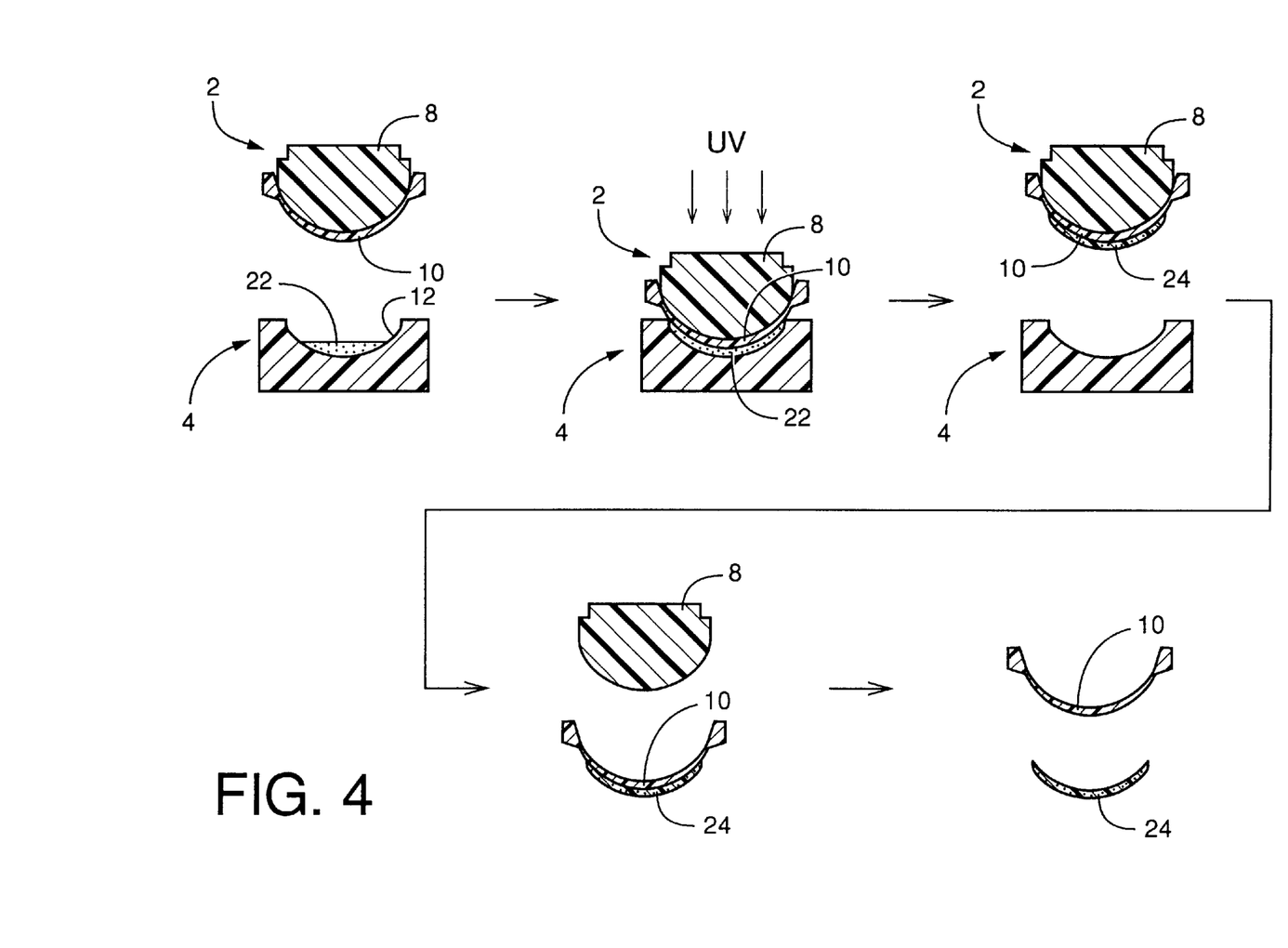
FIG. 4 is a view schematically showing a process of producing the ophthalmic lens according to the present invention by using the mold assembly of FIG. 1.

Referring next to FIG. 4, there is schematically shown a process of manufacturing an intended ophthalmic lens such as a contact lens or an intraocular lens, by using the mold assembly consisting of the coated male mold 2 prepared as described above and the non-coated female mold 4.

Initially, a lens material 22 is introduced into a recess of the female mold 4, which recess is defined by the concave molding surface 12 that gives the front curved surface of the intended ophthalmic lens. Next, the coated male mold 2 and the non-coated female mold 4 are closed together to provide the mold cavity 6 which is filled with with the lens material 22. In this state, the lens material 22 in the mold cavity 6 is molded into the intended ophthalmic lens 24 by polymerization of the lens material.

While the lens material 22 which fills the mold cavity 6 may be selected from among any known materials such as a polymer and a monomer, it is preferable to use a polymeric material similar to that conventionally used, i.e., a monomer liquid which gives a polymer of the intended ophthalmic lens. The monomer liquid generally includes at least one conventionally used radically polymerizable compound. Alternatively, the monomer liquid may be composed of a macromer or a prepolymer. Such a compound includes at least one of vinyl, allyl, acryl and methacryl groups in its molecule, and is conventionally used as a material for a hard contact lens, a soft contact lens or an intraocular lens. Examples of such a compound include: esters of (meth) acrylic acid such as alkyl (meth)acrylate, siloxanyl (meth) acrylate, fuluoroalkyl (meth)acrylate, hydroxyalkyl (meth) acrylate, polyethyleneglycol (meth)acrylate and polyhydric alcohol (meth)acrylate; derivatives of styrene; and N-vinyllactam. The monomer liquid includes, as needed, a polyfunctional monomer as a cross-linking agent, such as ethyleneglycol di(meth)acrylate or diethyleneglycol di(meth)acrylate. The monomer liquid further includes, as additives, a polymerization initiator such as thermopolymerization initiator or photopolymerization initiator, and a photosensitizer.

The polymeric material (monomer liquid) 22 which fills the mold cavity 6 is polymerized according to a known thermopolymerization or a photopolymerization method, for instance. When the polymeric material (22) is polymerized by the photopolymerization method, the polymeric material needs to be exposed to light such as a UV radiation, for instance. In view of this, the body portion 8 and the thermoplastic film 10 of the coated male mold 2 are formed of a light-transmitting material, preferably, a transparent material, so that the polymeric material (22) in the mold cavity 6 is polymerized by exposure to the light transmitted through the body portion 8 and the thermoplastic film 10.

When the molding operation to form the lens of the lens material 22 is finished upon completion of the polymerization of the polymeric material, the coated male mold 2 and the non-coated female mold 4 are disassembled from each other. Namely, the coated male mold 2 is removed from the female mold 4 with the molded ophthalmic lens 24 (contact lens in this embodiment) being held on the thermoplastic film 10 of the coated male mold 2.

Subsequently, the body portion 8 of the coated male mold 2 is removed from the thermoplastic film 10 on which the molded ophthalmic lens 24 is held, and then the lens 24 is removed from the thermoplastic film 10, so that the intended ophthalmic lens 24 is obtained.

For permitting the molded ophthalmic lens 24 to be held on the body portion 8 via the thermoplastic film 10 when the coated male mold 2 is removed from the female mold 4, the female mold 4 is formed of the above-described resin material such as polypropylene, which assures easy separation or removal of the obtained lens 24 therefrom. Further, for assuring easy removal of the thermoplastic film 10 from the body portion 8 and from the molded ophthalmic lens 24, the thermoplastic film 10 is formed of the above-described thermoplastic resin material such as polyolefin. Alternatively, the thermoplastic film 10 is separated from the body portion 8 or from the ophthalmic lens 24, by immersing the mold assembly in a suitable solvent, or by applying hot air. Further, the thermoplastic film 10 may be separated from the body portion 8 or from the ophthalmic lens 24 by deforming the thermoplastic film 10 by application of a force therebetween.

After the ophthalmic lens 24 is released from the mold assembly as described above, the used thermoplastic film 10 is discarded while the body portion 8 can be used as a first die in the press forming operation (shown in FIG. 3) for press-forming another thermoplastic film 10 thereon to provide the coated male mold 2, since the body portion 8 which has been used in the molding operation does not suffer from any deformation or damage, and is kept stainless without being contaminated by the lens material, owing to the thermoplastic film 10 which covered the convex surface 9 of the body portion 8, which surface 9 serves as the backing surface that substantially determines the configuration of the convex molding surface 11.

In the molding operation for forming the intended ophthalmic lens 24 using the mold assembly consisting of the coated male mold 2 and the non-coated female mold 4 according to the present embodiment, the thermoplastic film 10 which has the convex molding surface 11 that gives the base curved surface of the intended ophthalmic lens 24 is supported or backed by the body portion 8, so that the thermoplastic film 10 can be effectively prevented from being deformed. Accordingly, the ophthalmic lens 24 to be obtained has the desired surface configuration. Moreover, the thermoplastic film 10 adhering to and held by the body portion 8 effectively maintains its nominal curved configuration suitable for giving the intended optical surface of the lens to be obtained, throughout the molding operation. This would be difficult if the thermoplastic film 10 were not supported by the body portion 8.

While the present invention has been described in detail in its presently preferred embodiments, it is to be understood that the invention is not limited to the details of the illustrated embodiments, but may be otherwise embodied.

For instance, the convex and concave surfaces 9, 13a of the male and female molds 2, 4 are suitably shaped depending upon the configurations of the ophthalmic lens to be obtained. In producing a convex ophthalmic lens, two mold halves respectively having concave molding surfaces are assembled together to form a mold assembly of the present invention.

To further clarify the present invention, there will be described one example of the invention. It is to be understood that the present invention is not limited to the details of the illustrated example, but may be otherwise embodied with various changes, improvements and modifications, which may occur to those skilled in the art, without departing from the scope of the attached claims.

EXAMPLE

The coated male mold 2 shown in FIG. 1 was prepared in the following manner. Initially, there was prepared the body portion 8 as the first die, which is formed of polymethyl methacrylate and has a convex part-spherical surface 9 which will be coated with the thermoplastic film 10 as described below and which has a radius of 7.0 mm. Further, the second die 20 shown in FIG. 3 was prepared by using a brass material. The second die 20 has a concave part-spherical surface 20a functioning as a press forming surface for giving a convex molding surface 11 of the thermoplastic film 10, and has a diameter of 7.25 mm.

The thermoplastic film 10 was prepared by using a polyethylene (PE) film 10a having a diameter of 20 mm and a thickness of 0.5 mm. The PE film 10a was heated by an electric heater for about ten seconds at its central 14 mm-diameter circular portion, whereby the film 10a was sufficiently softened.

Next, the first die in the form of the body portion 8 prepared as described above was attached to the die holder 16 of a pneumatically operated press while the second die 20 was attached to the die holder 18. After the PE film 10a which has been softened by heating was placed between the first and second dies 8, 20, the PE film 10a was subjected to a press forming operation at a pressure of 10 kg/cm$^2$ for 15 seconds. When the press forming operation on the PE film 10a to form the thermoplastic film 10 was completed, the pressure was released, and the first and second dies 8, 20 were separated from each other. It was confirmed that the film 10 was formed in close contact with the body portion 8. In this state, the convex part-spherical surface 11 of the film 10 was examined of its spherical degree by using a laser interferometer. The result of the examination revealed that the spherical degree of the convex surface 11 of the film 10 adhering to the body portion 8 was sufficient to give the base curved surface of the intended contact lens.

The thus obtained coated male mold 2 consisting of the body portion 8 and the thermoplastic film 10 adhering thereto was removed from the die holder 16. Subsequently, the molding operation (polymerization) for forming the intended contact lens 24 was effected in the manner shown in FIG. 4, by using the thus obtained coated male mold 2 and the polypropylene female mold 4 separately prepared by a cutting operation and having the concave part-spherical molding surface 12 whose profile follows that of the front curved surface of the intended contact lens 24.

Described in detail, there was introduced, in a recess defined by the concave part-spherical molding surface 12 of the female mold 4, the polymeric lens material 22 formed of a monomer liquid that contains 100 parts by weight of 2-hydroxyethyl methacrylate, 0.2 part by weight of a photopolymerization initiator, and 0.2 part by weight of ethyleneglycol dimethacrylate as a cross-linking agent. With the recess of the female mold 4 being filled with the lens material 22, the coated male mold 2 was assembled with the female mold 4. In this state, a UV radiation having a principal wavelength of 360 nm and an intensity of about 0.1 mw/cm$^2$ was applied for one hour to the coated male mold 2 on the side remote from the female mold 4, whereby the lens material 22 was photopolymerized.

When the photopolymerization of the lens material 22 by exposure to the UV radiation is completed, the coated male mold 2 is removed from the female mold 4 with the molded contact lens 24 being held on the film 10 of the coated mold 2. Subsequently, the body portion 8 of the coated male mold 2 is separated from the thermoplastic film 10 by application of a force thereto. Then, a structure consisting of the film 10 and the molded contact lens 24 was subjected to a hydration treatment, so that the contact lens 24 was removed from the film 10.

The thus obtained contact lens 24 was examined of its optical power, and it was confirmed that the contact lens 24 had an intended optical power and satisfactory optical characteristics.

What is claimed is:

1. A mold assembly for forming an ophthalmic lens, said mold assembly comprising a first mold and a second mold which cooperate with each other to define therebetween a mold cavity having a profile following that of said ophthalmic lens, wherein the improvement comprises:

at least one of said first and second molds being a coated mold consisting of a body portion including a backing surface having rigidity and mechanical strength enough to withstand a molding operation for forming said ophthalmic lens in said mold cavity, and a thermoplastic film retained on said body portion such that said thermoplastic film covers said backing surface of said body portion, said thermoplastic film having a molding surface which partially defines said mold cavity and which gives a corresponding one of opposite surfaces of said ophthalmic lens, said thermoplastic film having been softened by heating and placed between said first and second molds, followed by effecting a press-forming operation on said thermoplastic film, whereby said thermoplastic film is retained in close contact with said backing surface, so that said thermoplastic film cooperates with said body portion to provide said coated mold.

2. A mold assembly according to claim 1, wherein said thermoplastic film has a thickness value of 0.1–1 mm.

3. A mold assembly according to claim 1, wherein said thermoplastic film is formed of polyolefin.

4. A method of producing a mold assembly for forming an ophthalmic lens, as defined in claim 1, comprising the steps of:

preparing a first die functioning as said body portion of said coated mold which consists of each of said at least one of said first and second molds, and a second die which has a press forming surface having a profile following that of said corresponding one of said opposite surfaces of said ophthalmic lens;

placing a sheet of thermoplastic material which has been softened by heating, between said first and second dies; and press-forming said thermoplastic film against one of said dies which is to be used to define a mold cavity in a molding operation, by effecting a press forming operation on said sheet of the thermoplastic material interposed between said first and second dies, so that said thermoplastic film is retained on said first die functioning as said body portion, to thereby provide said coated mold consisting of said body portion and said thermoplastic film.

5. A method according to claim 4, wherein said sheet of the thermoplastic material is heated prior to said press forming operation to a temperature which is higher by 50–150° C. than a second order transition point of said thermoplastic material, and said press forming operation on said sheet of the thermoplastic material is effected at a pressure of 1–100 kg/cm$^2$.

6. A method of producing an ophthalmic lens by using a mold assembly comprising the steps of:

producing a mold assembly by performing a method as recited in claim 4;

assembling said first and second molds together to define said mold cavity therebetween, said coated mold consisting of said body portion and said thermoplastic film which covers said backing surface of said body portion;

effecting a molding operation in which a lens material is introduced into said mold cavity for forming said ophthalmic lens in said mold cavity; and disassembling said first and second molds from each other for removing said ophthalmic lens formed in said mold cavity defined between said first and second molds.

7. A method according to claim 6, wherein the step of effecting said molding operation is conducted by first introducing, into said mold cavity, a polymeric material that gives a polymer which forms said ophthalmic lens, and then polymerizing said polymeric material in said mold cavity.

8. A method according to claim 7, wherein said body portion and said thermoplastic film which cooperate with each other to provide said coated mold are formed of a light-transmitting material, and said polymeric material which is introduced in said mold cavity is polymerized by light transmitted through said body portion and said thermoplastic film.

9. A method according to claim 6, wherein said at least one of said first and second molds functioning as said coated mold consists of one of said first and second molds, and the step of disassembling said first and second molds is effected by first removing said coated mold while said ophthalmic lens is held on said thermoplastic film of said coated mold, and then removing said body portion and said thermoplastic film from said ophthalmic lens.

* * * * *